United States Patent
Sugiura et al.

(10) Patent No.: US 8,622,088 B2
(45) Date of Patent: Jan. 7, 2014

(54) SOLENOID VALVES CAPABLE OF CONTROLLING VALVE-OPENING AREA

(75) Inventors: Masahiro Sugiura, Anjo (JP); Takashi Nagai, Handa (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 96 days.

(21) Appl. No.: 12/986,668

(22) Filed: Jan. 7, 2011

(65) Prior Publication Data

US 2011/0168931 A1  Jul. 14, 2011

(30) Foreign Application Priority Data

Jan. 13, 2010 (JP) ................................. 2010-004670

(51) Int. Cl.
 *F16K 11/16* (2006.01)

(52) U.S. Cl.
 USPC .................. 137/630.15; 137/630.16; 137/630

(58) Field of Classification Search
 USPC ........... 137/629, 630, 630.15, 630.16, 630.18
 See application file for complete search history.

(56) References Cited

U.S. PATENT DOCUMENTS

| | | | | |
|---|---|---|---|---|
| 2,370,182 A | * | 2/1945 | Morrow et al. | 137/630.15 |
| 2,508,064 A | * | 5/1950 | Hazard | 235/132 E |
| 2,805,039 A | * | 9/1957 | Angelery | 251/38 |
| 3,213,887 A | * | 10/1965 | Angelery | 137/630.15 |
| 3,439,711 A | * | 4/1969 | Sherwood et al. | 137/630.15 |
| 3,447,568 A | * | 6/1969 | Burkart et al. | 137/630.13 |
| 3,575,213 A | * | 4/1971 | Schnall | 137/630.13 |
| 3,741,245 A | * | 6/1973 | West | 137/596.18 |
| 3,756,283 A | * | 9/1973 | Angelery | 137/630.15 |
| 4,615,354 A | * | 10/1986 | Bianchi | 137/110 |
| 5,669,413 A | * | 9/1997 | Hegglin et al. | 137/554 |
| 8,506,692 B2 | * | 8/2013 | Sugiura | 96/147 |
| 2007/0034268 A1 | * | 2/2007 | Baltz | 137/630.15 |

FOREIGN PATENT DOCUMENTS

| | | |
|---|---|---|
| JP | 55-158366 U | 11/1980 |
| JP | 61-160682 A | 7/1986 |
| JP | 1-135984 A | 5/1989 |
| JP | 532888 U | 4/1993 |
| JP | 5-45360 U | 6/1993 |
| JP | 6-241341 A | 8/1994 |
| JP | 7310849 | 11/1995 |
| JP | 11344145 | 12/1999 |
| JP | 2001-206082 A | 7/2001 |
| JP | 2001241563 | 9/2001 |

(Continued)

OTHER PUBLICATIONS

Office Action dated Mar. 19, 2013 for Application No. JP 2010-004670.

(Continued)

*Primary Examiner* — John Rivell
*Assistant Examiner* — R. K. Arundale
(74) *Attorney, Agent, or Firm* — Ladas & Parry LLP

(57) ABSTRACT

A solenoid valve has a valve housing, first and second valve members, first and second biasing members, a pressing rod and an electromagnetic driving member. The valve housing defines a fluid pathway for flowing fluid therein. The first and the second valve members are configured to open and close the fluid pathway, respectively. The first biasing member biases the first valve member in a direction for closing the fluid pathway. The second biasing member biases the second valve member in a direction for closing the fluid pathway. The electromagnetic driving member sequentially presses the pressing rod against the first valve member and the second valve member in order to open the fluid pathway in stages.

7 Claims, 7 Drawing Sheets

(56) References Cited

FOREIGN PATENT DOCUMENTS

JP   2005-104394 A   4/2005
JP   2005291241      10/2005

OTHER PUBLICATIONS

Patent Abstracts of Japan English abstract of JP 1-135984 A, May 1989.

Patent Abstracts of Japan English abstract of JP 61-160682 A, Jul. 1986.

Patent Abstracts of Japan English abstract of JP 6-241341 A, Aug. 1994.

Patent Abstracts of Japan English abstract of JP 2005-104394 A, Apr. 2005.

Patent Abstracts of Japan English abstract of JP 2001-206082 A, Jul. 2001.

* cited by examiner

SOLENOID VALVES CAPABLE OF CONTROLLING VALVE-OPENING AREA

CROSS-REFERENCES TO RELATED APPLICATIONS

This application claims priority to Japanese patent application serial number 2010-004670, the contents of which are incorporated herein by reference.

BACKGROUND OF THE INVENTION

1. Field of the Invention

The present disclosure relates to solenoid valves, each of which is mounted in a fuel vapor treating system for controlling an amount of the fuel vapor flowing in the fuel vapor treating system.

2. Description of the Related Art

A gas vehicle is equipped with a fuel vapor treating system for preventing fuel vapor vaporized in a fuel tank from flowing into the atmosphere. The fuel vapor treating system includes a canister filled with an adsorbent and temporally trapping the fuel vapor by adsorbing the fuel vapor onto the adsorbent. The fuel vapor treating system has valves, each of which is generally composed of a solenoid valve, for opening and closing pipes communicating the fuel tank, the canister and the atmosphere each other in order to control flow of the fuel vapor in the fuel vapor treating system.

Japanese Laid-Open Patent Publication No. 2005-291241 discloses a solenoid valve having a first valve member, a second valve member, a second valve seat for the second valve member, an electromagnetic driving member, a first pathway and a second pathway for receiving and discharging fluid therethrough. The second valve member has a first valve seat for the first valve member and defines a communicating pathway for communicating the first pathway and the second pathway. When the first valve member and the second valve member contact the first valve seat and the second valve seat, respectively, communication between the first pathway and the second pathway is blocked. When the electromagnetic driving member moves the first valve member away from the first valve seat while the second valve member is contacting the second valve seat, the first pathway and the second pathway are communicated with each other via the communicating pathway. In this state, when differential pressure between the first pathway and the second pathway decreases, the second valve member moves away from the second valve seat due to biasing force from a spring, which biases the second valve member. As a result, a valve-opening area for flowing the fuel vapor increases, and thus the flow rate of the fuel vapor flowing from the first pathway into the second pathway also increases.

There has been a need for improved solenoids capable of controlling flow rate of fluid.

SUMMARY OF THE INVENTION

One aspect according to this disclosure includes a solenoid valve including a valve housing defining a fluid pathway for flowing fluid therein, a first valve member configured to open and close the fluid pathway, a first biasing member biasing the first valve member in a direction for closing the fluid pathway, a second valve member configured to open and close the fluid pathway, a second biasing member biasing the second valve member in a direction for closing the fluid pathway, an pressing rod, and an electromagnetic driving member pressing the pressing rod against the first valve member and the second valve member sequentially in order to open the fluid pathway in stages.

In accordance with this aspect, it is able to sequentially and concisely open the first valve member and the second valve member. Thus, it is able to improve control accuracy as for flow rate in the fluid pathway.

DETAILED DESCRIPTION OF THE PREFERRED EMBODIMENTS

Each of the additional features and teachings disclosed above and below may be utilized separately or in conjunction with other features and teachings to provide improved solenoid valves. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
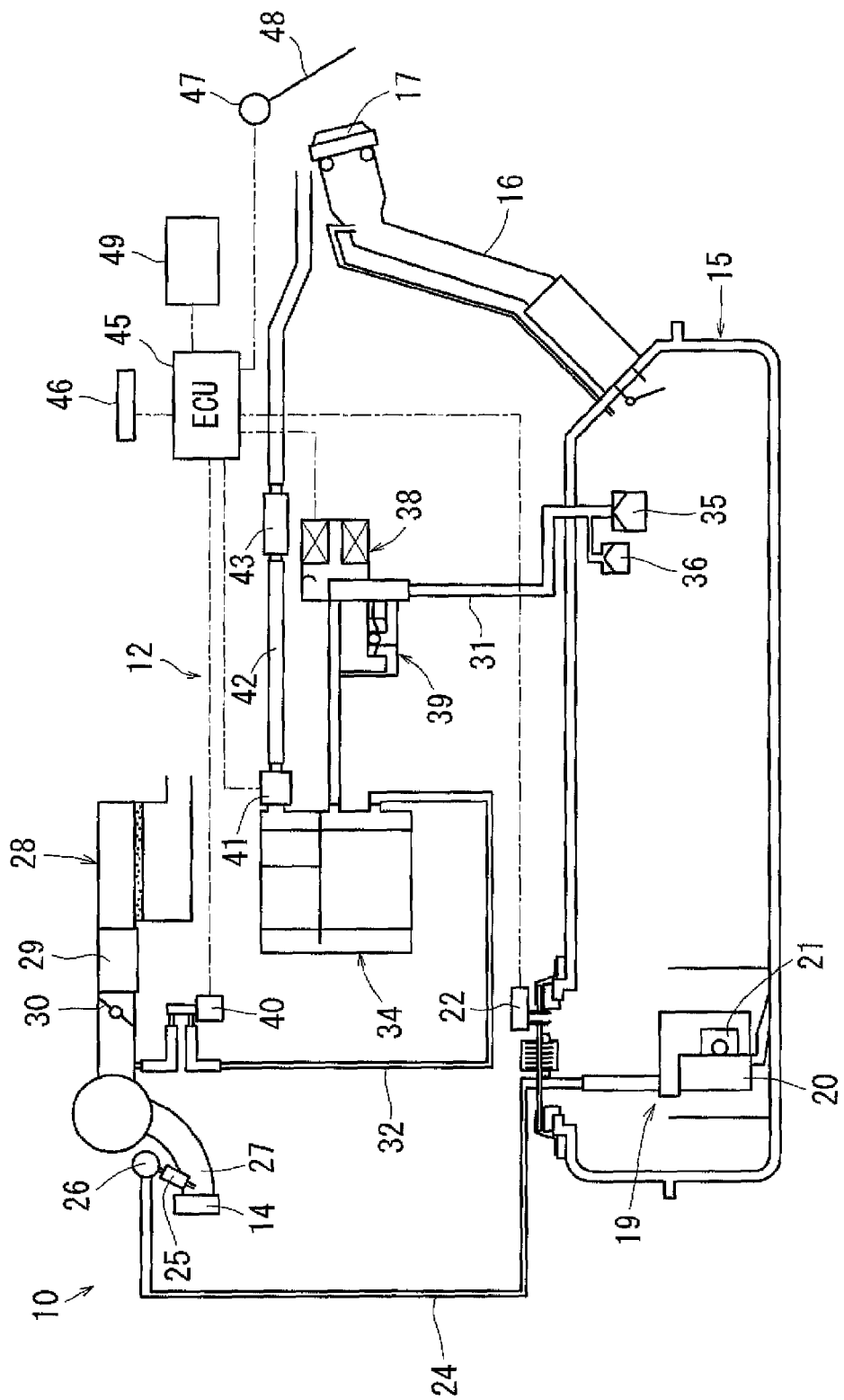
FIG. 1 is a schematic view showing a fuel vapor treating system in a first embodiment.

A first embodiment of the present disclosure will be described. For convenience of explanation, a fuel vapor treating system for an engine (internal combustion engine) will be described at first, and then a flow control valve corresponding to a solenoid valve attached to the fuel vapor treating system will be described. FIG. 1 is a schematic view of the fuel vapor treating system.

As shown in FIG. 1, an engine system 10 for automobile such as gasoline vehicle is provided with a fuel vapor treating system 12. The engine system 10 has an engine 14, and a fuel tank 15 for reserving fuel, which is provided to the engine 14. The fuel tank 15 has an inlet pipe 16 having a fill opening. The inlet pipe 16 transports fuel from the fill opening into the fuel tank 15. The fill opening, which is upper end of the inlet pipe 16, is provided with a tank cap 17 in a removable manner.

Inside of the fuel tank 15, a fuel supply device 19 is provided. The fuel supply device 19 has a fuel pump 20, a sender gage 21 and an internal pressure sensor 22, etc. The fuel pump 20 suctions the fuel reserved in the fuel tank 15, applies pressure on the fuel and then discharges it. The sender gage 21 detects a liquid level of the fuel. The internal pressure sensor 22 detects an internal pressure of the fuel tank 15, which is pressure relative to the ambient pressure. The fuel pump 20 pumps the fuel from the fuel tank 15 through a fuel supply pipe 24 into the engine 14, in particular, into a delivery pipe 26 having injectors (fuel injection valve) 25, each of which corresponds to each combustion chambers. And then, the fuel is injected from the injectors 25 into an air intake pipe 27. The air intake pipe 27 is connected with an air cleaner 28, an airflow meter 29, a throttle valve 30 and the like.

The fuel vapor treating system 12 has a fuel vapor pipe 31, a purge pipe 32 and a canister 34. The fuel vapor pipe 31 has one end (at upstream side) communicated with a gaseous layer in the fuel tank 15 and the other end (at downstream side) connected with the canister 34. The purge pipe 32 has one end (at upstream side) connected with the canister 34 and the other end (at downstream side) communicated with the air intake pipe 27 downstream of the throttle valve 30. The canister 34 is filled with an adsorbent composed of activated carbon. The fuel vapor vaporized in the fuel tank 15 flows through the fuel vapor pipe 31 into the canister 34 and is adsorbed on the adsorbent (activated carbon) in the canister 34. In the fuel tank 15, the upstream end of the fuel vapor pipe 31 is provided with a fuel cut-off valve 35 and an on board refueling vapor recovery valve 36.

The fuel vapor pipe 31 has a flow control valve 38. The flow control valve 38 is a solenoid valve, which opens and closes depending on signals from outside, i.e., an ECU 45 (described below). The flow control valve 38 is integrated with a relief valve 39. The relief valve 39 is a mechanical bi-directional check valve having a forward directional relief valve, which opens when a pressure at the side connecting with the fuel tank 15 is higher by a predetermined value than a pressure at the other side connecting with the canister 34, and a reverse directional relief valve, which opens when the pressure at the side connecting with the fuel tank 15 is lower by a predetermined value than the pressure at the other side connecting with the canister 34. The purge pipe 32 has a purge valve 40 composed of a solenoid valve, which opens and closes depending on signals from the ECU 45 (described below).

The canister 34 is connected with an air pipe 42 via a switching valve 41. The switching valve 41 communicates the canister 34 with the air pipe 42 in non-power distribution condition (OFF condition), and blocks such communication between the canister 34 and the air pipe 2 when signals are transmitted from the ECU 45, i.e., in power distribution condition (ON condition). The air pipe 42 is equipped with an air filter 43.

The fuel vapor treating system 12 includes the ECU 45. The ECU 45 is connected with the internal pressure sensor 22, the flow control valve 38, the purge valve 40, the switching valve 41, a lid switch 46, a lid opener 47, and a display 49, etc. The lid opener 47 is connected with a manually-operated lid opening and closing device (not shown) for manually opening and closing a lid 48 covering the fill opening. The lid opener 47 is a lock system for the lid 48, which unlocks the lid 48 when the lid opener 47 receives lid opening signals from the ECU 45 or when the manually-operated lid opening and closing device is operated in order to open the lid 48. The lid switch 46 outputs signals for unlocking the lid 48 to the ECU 45. Here, the ECU 45 corresponds to "control circuit" in this disclosure.

Then, basic mechanism of the fuel vapor treating system 12 will be described.

(1) During Parking

When the automobile is parked, the flow control valve 38 is kept in a closed state. Thus, when the internal pressure of the fuel tank 15 is lower than a predetermined pressure required for opening the relief valve 39 in the forward direction (positive pressure), the fuel vapor in the fuel tank 15 does not flow into the canister 34. And, when the internal pressure of the fuel tank 15 is higher than a predetermined pressure required for opening the relief valve 39 in the reverse direction (negative pressure), air does not flow into the fuel tank 15. Here, the purge valve 40 and the switching valve 41 are also closed.

(2) During Refueling

When the lid switch 46 is operated during parking, the ECU 45 outputs signals in order to open the flow control valve 38. At that time, in a case that the internal pressure of the fuel tank 15 is higher than the atmospheric pressure, the fuel vapor simultaneously flows into the canister 34 through the fuel vapor pipe 31 as soon as the flow control valve 38 opens, and then the fuel vapor is adsorbed on the adsorbent in the canister 34. In this way, it is able to prevent the fuel vapor from releasing into the atmosphere. This leads decrease in the internal pressure of the fuel tank 15 to a value close to the atmospheric pressure. When the internal pressure of the fuel tank 15 decreases to the value close to the atmospheric pressure, the ECU 45 outputs signals for unlocking the lid 48 to the lid opener 47. The lid opener 47 receives the signals and unlocks the lid 48, so that the lid 48 can be opened. Then, after the lid 48 is opened and the tank cap 17 is removed, the fuel tank 15 is refueled. Here, because the tank cap 17 is removed after the internal pressure of the fuel tank 15 decreases to the value close to the atmospheric pressure, it is able to prevent the fuel vapor from releasing into the atmosphere from the fill opening. In addition, the ECU 45 keeps the flow control valve 38 in an open state till the refueling is over, in particular, the lid 48 is closed. Thus, the fuel vapor in the fuel tank 15 flows through the fuel vapor pipe 31 into the canister 34 and is trapped on the adsorbent in the canister 34 during refueling. Some of other gases in the fuel tank 15 also flow into the canister 34 through the fuel vapor pipe 31 and are trapped on the adsorbent in the canister 34.

(3) During Driving

When requirements for purge are met during driving, the ECU 45 outputs signals for purging the fuel vapor trapped in the canister 34. In a state that the switching valve 41 is opened for communicating the canister 34 and the air pipe 42 each other, the purge valve 40 is controlled to be opened and closed due to such signals. When the purge valve 40 is opened, the engine 14 is communicated with the canister 34 via the purge pipe 32. Because an internal pressure of the engine 14 is lower than that of the canister 34, the fuel vapor in the canister 34 flows into the engine 14 via the air intake pipe 27 together with air suctioned from the air pipe 42, and then is burned in the engine 14. The ECU 45 keeps the flow control valve 38 in the open state during purge of the fuel vapor. Therefore, the internal pressure in the fuel tank 15 is kept to the value close to the atmospheric pressure.

Figure 2:
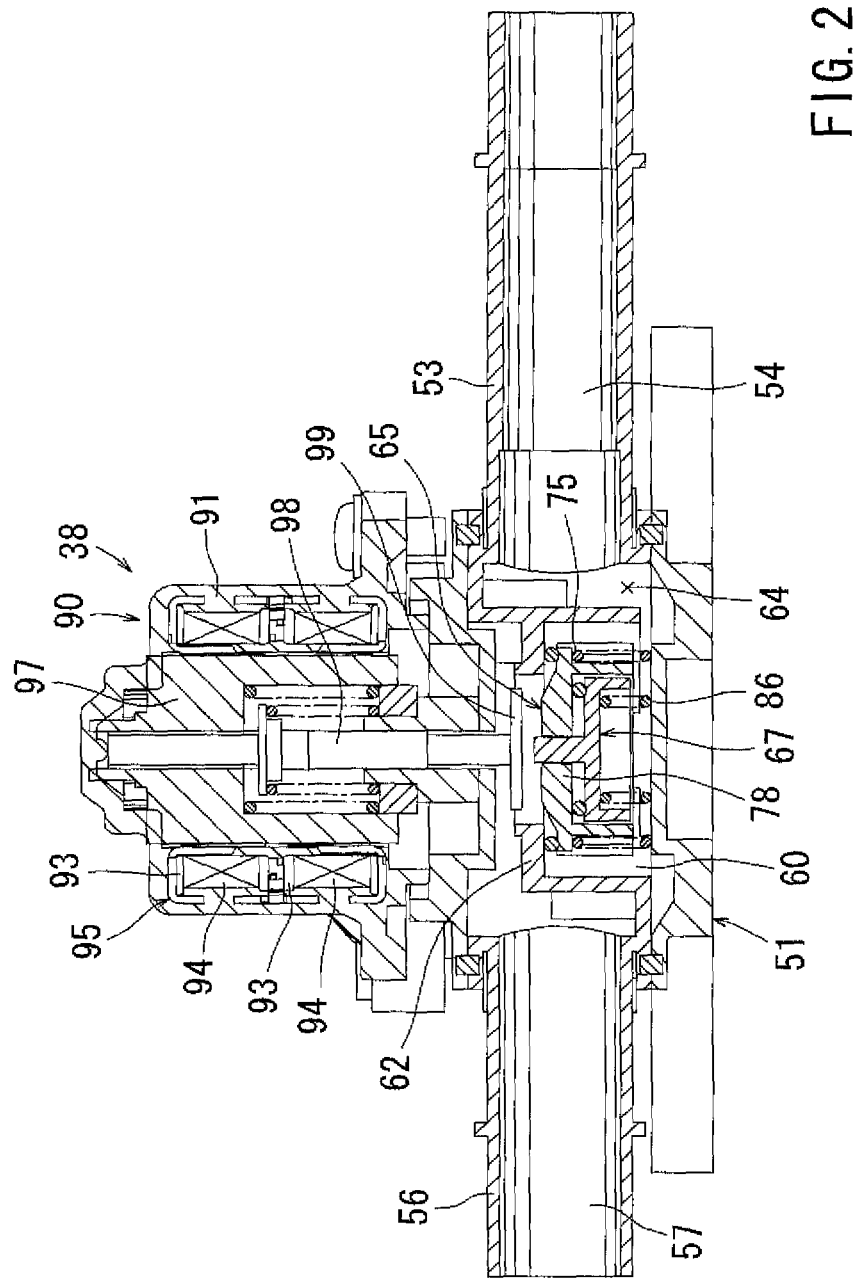
FIG. 2 is a cross sectional view of a flow control valve.
Figure 3:
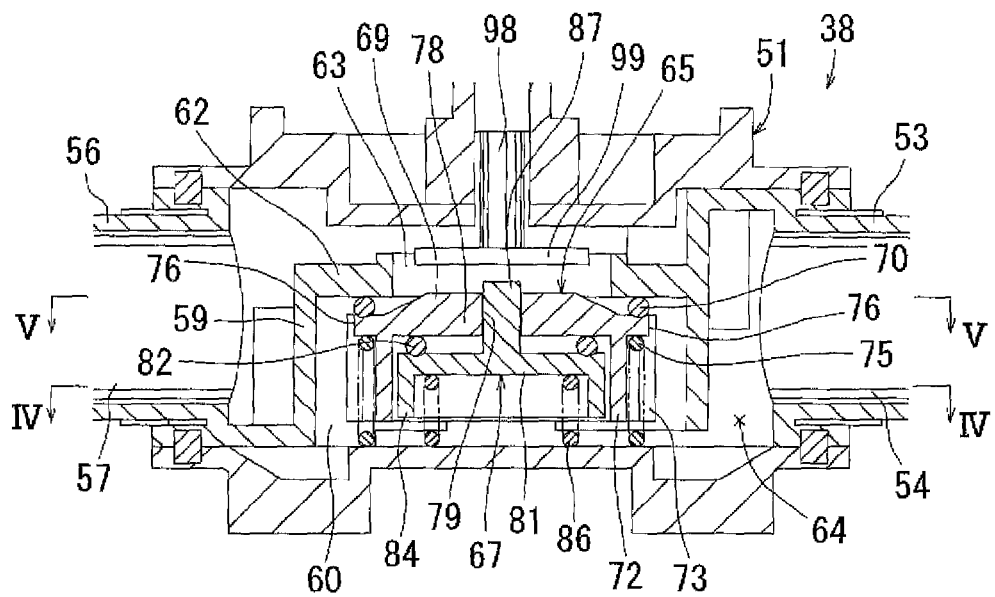
FIG. 3 is a cross sectional view of a main part of the flow control valve.
Figure 4:
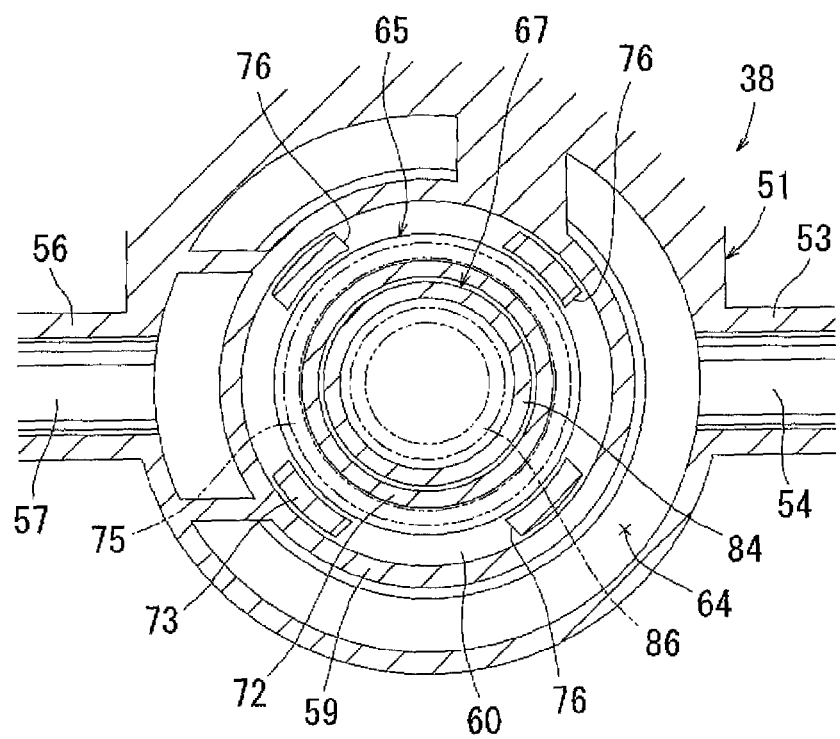
FIG. 4 is a cross sectional view along a line IV-IV in FIG. 3.
Figure 5:
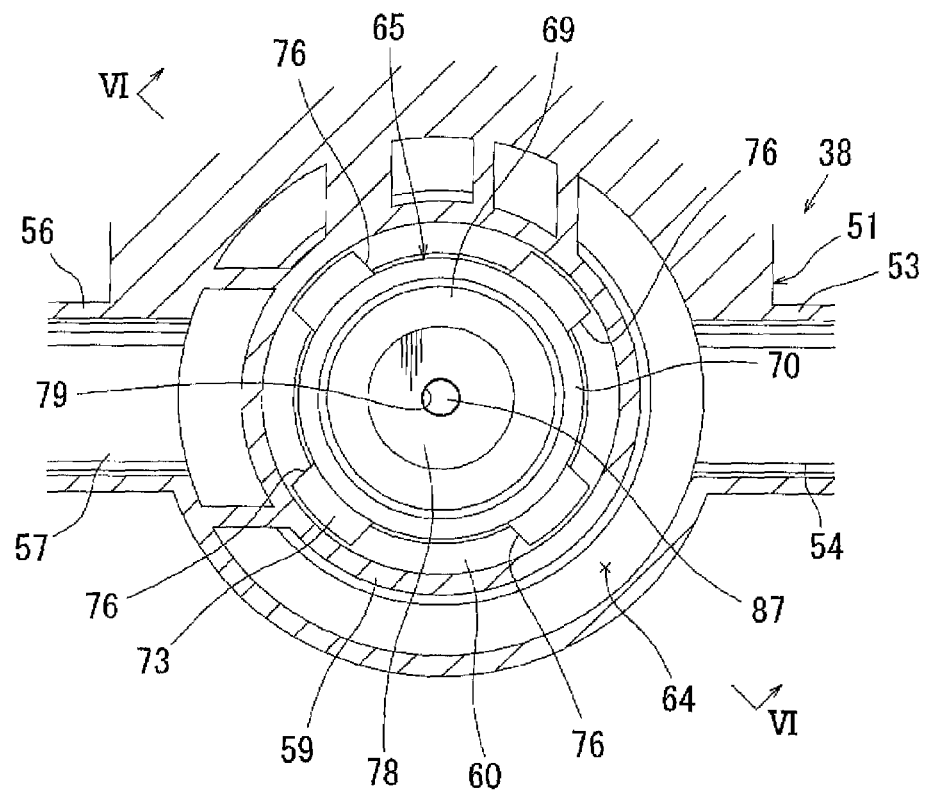
FIG. 5 is a cross sectional view along a line V-V in FIG. 3.
Figure 6:
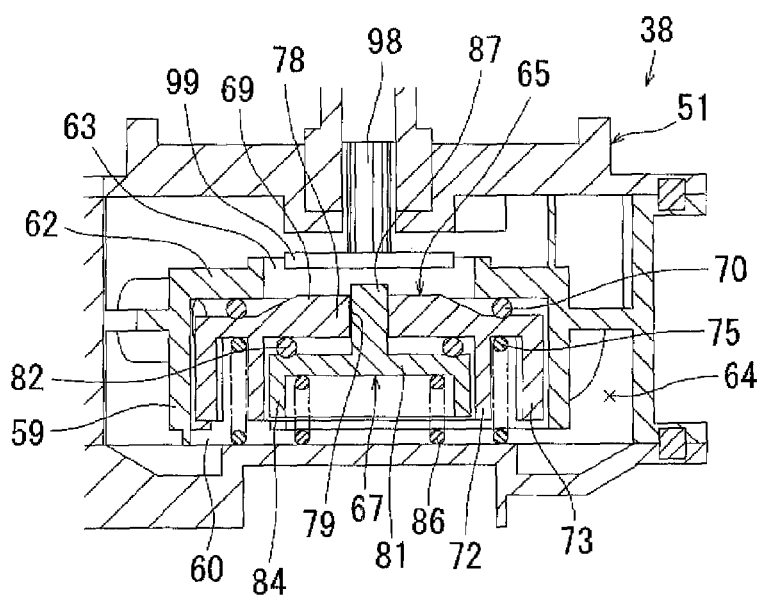
FIG. 6 is a cross sectional view along a line VI-VI in FIG. 5.

Then, the flow control valve 38 will be described in detail. FIG. 2 is a cross sectional view showing the flow control valve. FIG. 3 is a cross sectional view showing a main portion of the flow control valve. FIG. 4 is a cross sectional view along a line IV-IV in FIG. 3, FIG. 5 is a cross sectional view along a line V-V in FIG. 3. FIG. 6 is a cross sectional view along a line VI-VI in FIG. 5. For convenience of explanation, each directions, i.e., upper, lower, left and right directions, are defined based on the cross sectional view of FIG. 2.

As shown in FIG. 2, the flow control valve 38 has a valve housing 51. The valve housing 51 has a first connecting pipe 53 extending rightward from a right surface of the valve housing 51. The first connecting pipe 53 defines a first pathway 54 therein. The valve housing 51 has a second connecting pipe 56 extending leftward from a left surface of the valve housing 51. The second connecting pipe 56 defines a second pathway 57 therein.

As shown in FIG. 3, the valve housing 51 has a cylindrical wall 59 in a hollow cylindrical shape (refer to FIG. 4) in a central region of the valve housing 51. The cylindrical wall 59 defines a valve chamber 60 therein. The valve chamber 60 is communicated with the first pathway 54 via a lower opening of the cylindrical wall 59. The cylindrical wall 59 has an upper opening, which is closed with a second valve seat 62 in a circular plate shape. The second valve seat 62 has a lower surface for contacting and receiving a valve. The second valve seat 62 concentrically defines a second valve aperture 63 in a circular shape, which penetrates the second valve seat 62 in a vertical direction. The valve chamber 60 and the second pathway 57 are communicated with each other via the second valve aperture 63. Here, the first pathway 54, the second pathway 55 and the valve chamber 60 configure a fluid pathway 64.

The fluid pipe 64 of the flow control valve 38 (FIG. 2) is interposed in the fuel vapor pipe 31 communicating the fuel tank 15 and the canister 34 in the fuel vapor treating system 12. In detail, the first connecting pipe 53 (the first pathway 54) is connected with an upstream portion of the fuel vapor pipe 31 (closer to the fuel tank 15), whereas the second connecting pipe 56 (the second pathway 57) is connected with a downstream portion of the fuel vapor pipe 31 (closer to the canister 34). Thus, when the flow control valve 38 is opened, the fuel vapor from the fuel tank 15 flows through the fluid pathway 64 into the canister 34. And, when the flow control valve 38 is closed, the fuel vapor from the fuel tank 15 does not flow through the fluid pathway 64 into the canister 34. In addition, the valve housing 51 can be fixed on a vehicle body (not shown) by a bolt or the like.

As shown in FIG. 3, inside the valve chamber 60, a first valve member 67 and a second valve member 65 are concentrically disposed (refer to FIG. 4) such that they can move in the vertical direction. The second valve member 65, which is positioned above the first valve member 67, has a valve plate 69 as a main body in a circular plate shape corresponding to the second valve seat 62 of the valve housing 51. The valve plate 69 is moved downwardly from the second valve seat 62 in order to open the second valve aperture 63 of the second valve seat 62, and is moved upwardly and is contacted with the second valve seat 62 in order to close the second valve aperture 63. The valve plate 69 has a second sealing member 70 composed of an O-ring, which elastically contacts with the second valve seat 62, at an upper surface of the valve plate 69 (FIG. 3).

As shown in FIG. 6, the valve plate 69 of the second valve member 65 has an inner cylindrical portion 72 and an outer cylindrical portion 73, which are concentrically formed in a double hollow cylindrical shape and extend downwardly from an outer circumference of the valve seat 69. The outer cylindrical portion 73 has an outer diameter smaller than an inner diameter of the cylindrical wall. 59 of the valve housing 51. The outer cylindrical portion 73 is disposed inside the cylindrical wall 59 movably in an axial direction, i.e., the vertical direction, and there is an empty space between the cylindrical wall 59 and the outer cylindrical portion 73. Here, the cylindrical wall 59 of the valve housing 51 and the outer cylindrical portion 73 of the second valve member 65 corresponds to "second guide member" for guiding the second valve member 65 in the vertical direction, i.e., an opening direction and a closing direction.

In a ring space between the inner cylindrical portion 72 and the outer cylindrical portion 73 of the second valve member 65, a second coil spring 75 composed of a coil spring is disposed. The second coil spring 75 is placed between the valve plate 69 and a lower surface of the valve chamber 60, and always biases the second valve member 65 upwardly, i.e., in the closing direction. Here, the second coil spring 75 corresponds to "second biasing member" of this disclosure.

As shown in FIG. 5, the outer cylindrical portion 73 of the second valve member 65 is provided with a plurality (four in FIG. 5) of gaps 76, which are positioned at regular intervals in a circumferential direction and extends along an axial direction of the outer cylindrical portion 73. Thus, the outer cylindrical portion 73 is divided into the plurality (four in FIG. 5) of arc-shaped sections equally spaced in the circumferential direction. The gaps 76 extend upwardly such that they penetrate the outer circumference of the valve plate 69, which is connected with the outer cylindrical portion 73 (FIG. 3). Therefore, an upper flow pathway above the valve plate 69 and a lower flow pathway below the valve plate 69 in the valve chamber 60 are communicated with each other via the gaps 76. Here, based on a flow direction of the fuel vapor (fluid) in the fluid pathway 64, the lower flow pathway below the valve plate 69 corresponds to "an upstream side in a fluid pathway", and the upper flow pathway above the valve plate 69 corresponds to "a downstream side in a fluid pathway".

As shown in FIG. 3, the valve plate 69 has a circular plate shaped first valve seat 78 in a central region of the valve plate 69. The first valve seat 78 faces an inner space of the inner cylindrical portion 72 of the second valve member 65 and has a lower surface for seating a valve. The first valve seat 78 concentrically has a first valve aperture 78 in a circular shape. The first valve aperture penetrates the first valve seat 78 in the vertical direction. Accordingly, an upper flow pathway above the first valve seat 78 and a lower flow pathway below the first valve seat 78 in the valve chamber 60 are communicated with each other via the first valve aperture 79. The first valve aperture 79 has a smaller diameter than the second valve aperture 63. Here, based on the flow direction of the fuel vapor (fluid) in the fluid pathway 64, the lower flow pathway below the first valve seat 78 corresponds to the "an upstream side in a fluid pathway", and the upper flow pathway above the first valve seat 78 corresponds to the "a downstream side in a fluid pathway".

The first valve member 67 has a valve plate 81 as main body in a circular plate shape, which is configured to fit with the first valve seat 78 of the second valve member 65. The valve plate 81 is moved downwardly away from the first valve seat 78 in order to open the first valve aperture 79 of the first valve seat 78, whereas the valve plate 81 is moved upwardly and is contacted with the first valve seat 78 in order to close the first valve aperture 79. The valve plate 81 has a first sealing member 82 composed of an O-ring, which elastically contacts with the first valve seat 78, at an upper surface of the valve plate 81.

The first valve member 67 has a guide cylindrical portion 84, which is concentrically formed in a cylindrical shape and extends downwardly from an outer circumference of the valve plate 81. The guide cylindrical portion 84 has an outer diameter smaller than an inner diameter of the inner cylindrical portion 72 of the second valve member 65, and is placed inside the inner cylindrical portion 72 movably in the axial direction, i.e., the vertical direction. And, there is an empty space between the inner cylindrical portion 72 and the guide cylindrical portion 84. Here, the inner cylindrical portion 72 of the second valve member 65 and the guide cylindrical portion 84 of the first valve member 67 correspond to "first guide member" for guiding the first valve member 67 in the vertical direction, i.e., the opening direction and the closing direction.

Inside the guide cylindrical portion 84 of the first valve member 67, a first coil spring 86 composed of a coil spring is disposed. The first coil spring 86 is interposed between the valve plate 81 and the lower surface of the valve chamber 60, and always biases the first valve member 67 upwardly, i.e., in the closing direction. The first coil spring 86 and the second coil spring 75 are doubly placed, i.e. the first coil spring 86 is concentrically disposed inside the second coil spring 75 (FIG. 4). Here, the first coil spring 86 corresponds to "first biasing member" in this disclosure.

As shown in FIG. 3, the first valve member 67 concentrically has a protruding shaft 87 extending upwardly from the valve plate 81. The protruding shaft 87 has an outer diameter (shaft diameter) smaller than the diameter of the first valve aperture 79 of the second valve member 65, and is inserted into the first valve aperture 79 movably in the axial direction, i.e., the vertical direction. There is an empty ring space between the protruding shaft 87 and a wall of the second valve member 65 defining the first valve aperture 79, so that the upper flow pathway above the first valve seat 78 and the lower flow pathway below the first valve seat 78 are communicated with each other via the ring-shaped space between the protruding shaft 87 and the wall defining the first valve aperture 87. Here, the ring space between the protruding shaft 87 and the wall defining the first valve aperture 87 corresponds to "connecting pathway" in this disclosure.

As shown in FIG. 2, a step motor 90 is mounted on the valve housing 51. The step motor 90 has a motor housing 91, which is fixed on the valve housing 51 by a bolt or the like, and a stator 95 inside the motor housing 91. The stator 95 has a bobbin 93 and an exciting coil 94 winding around the bobbin 93. A rotor 97 rotating inside the stator 95 is provided at a predetermined level in the motor housing 91 and is supported rotatably around the vertical axis. Permanent magnets (not shown) are provided around an outer circumference of the rotor 97. The rotor 97 is concentrically engaged with an upper portion of an pressing rod 98. In detail, the pressing rod 98 has a screw head on its upper portion, and the screw head is inserted into a threaded hole formed in the rotor 97 along its axis. In addition, the pressing rod 98 is provided such that the pressing rod 98 cannot rotate around its axis relative to the motor housing 91. Thus, the pressing rod 98 reciprocates in the axial direction, i.e., the vertical direction due to forward and reverse rotations of the rotor 97. The axis of the pressing rod 98 is positioned concentrically with the cylindrical wall 59 of the valve housing 51, the second valve member 65 and the first valve member 67. The step motor 90 is controlled by the ECU 45 (FIG. 1). Here, the step motor 90 is called as stepper motor or stepping motor, etc., and corresponds to "electromagnetic driving member" in this disclosure.

As shown in FIG. 3, the pressing rod 98 has a lower end penetrating an upper wall of the valve housing 51 and extending near the second valve aperture 63 of the second valve seat 62. On the lower end of the pressing rod 98, a pressing plate 99 in a circular plate shape is formed concentrically. The pressing plate 99 is placed substantially parallel to the valve plate 69 of the valve member 65 such that a lower surface of the pressing plate 99 is directed toward an upper surface of the valve plate 69 and the protruding shaft 87 of the first valve member 67. The pressing plate 99 has an outer diameter, which is larger than the outer diameter of the pressing rod 98 and the diameter of the first valve aperture 79 of the second valve member 65 and is smaller than the diameter of the second valve aperture 63.

Figure 7:
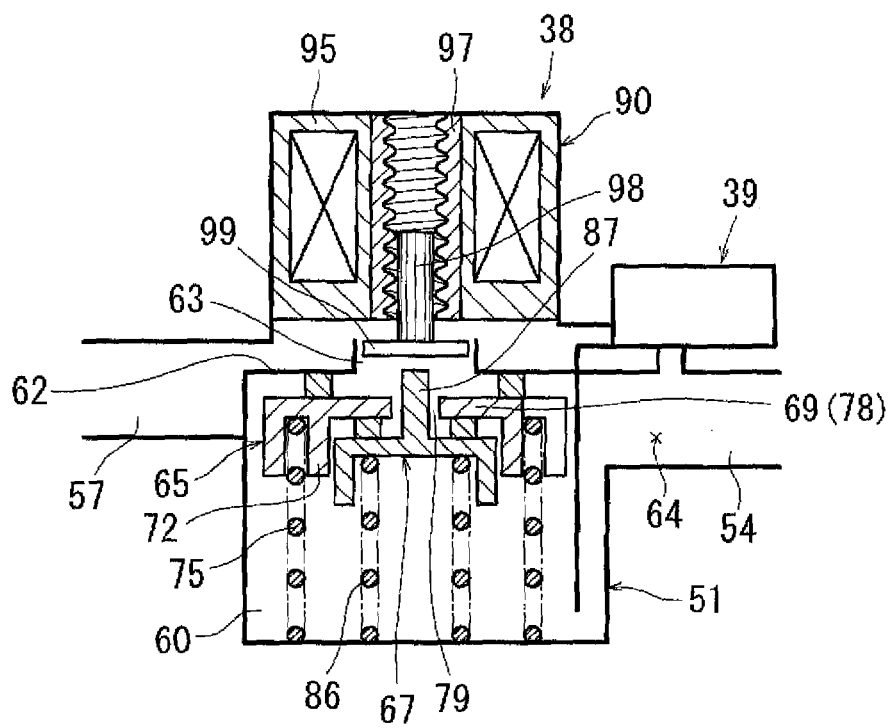
FIG. 7 is a schematic cross sectional view showing the flow control valve in a closed state.
Figure 8:
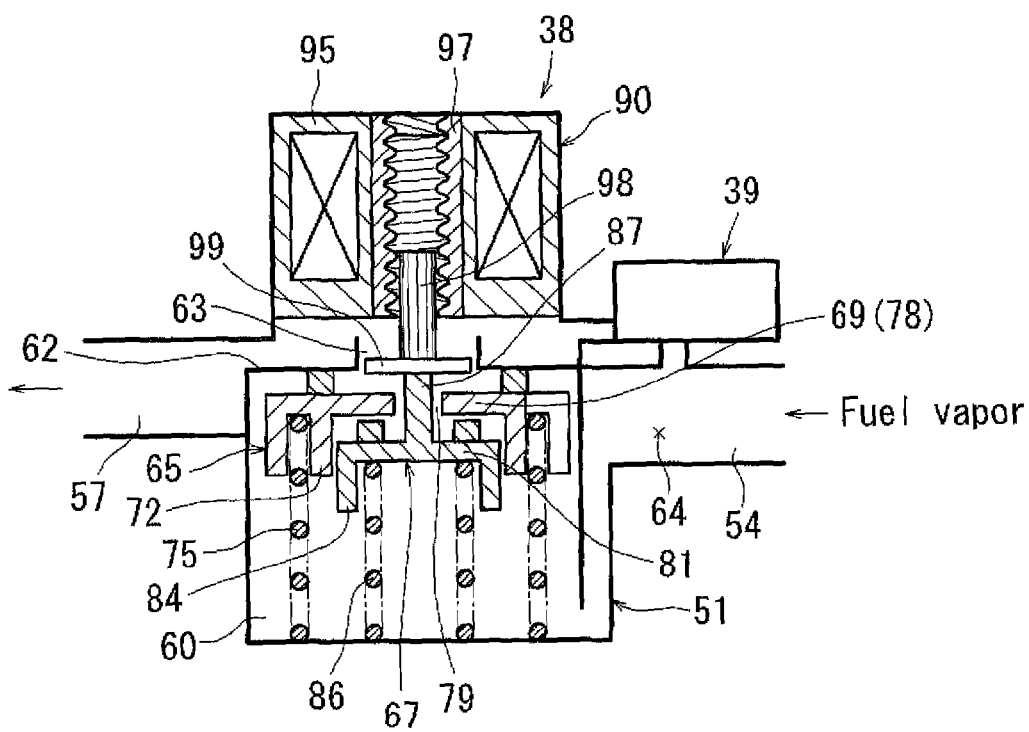
FIG. 8 is a schematic cross sectional view showing the flow control valve including a first valve member in an open state.
Figure 12:
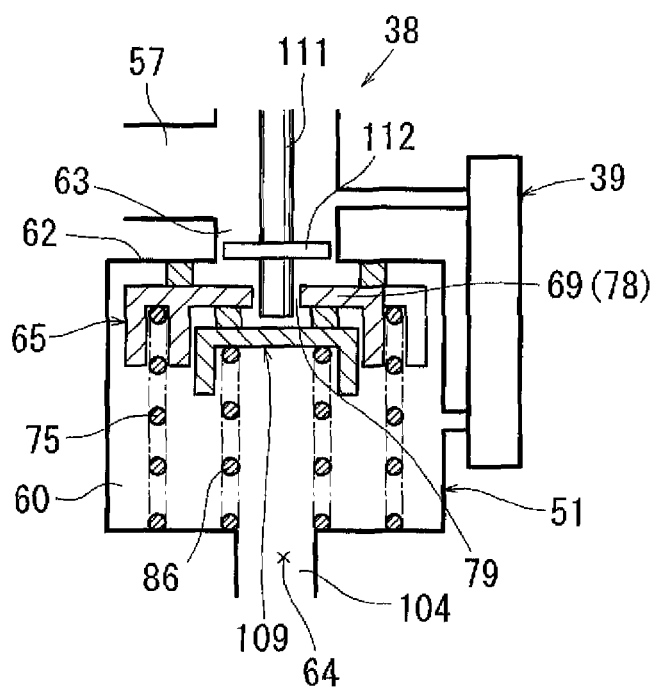
FIG. 12 is a schematic cross sectional view showing a main part of a flow control valve in a fourth embodiment.

Then, action of the flow control valve 38 will be described. FIG. 7 is a schematic view showing the flow control valve in a closed state. FIG. 8 is a schematic view of the flow control valve where the first valve member is in an open state. FIG. 12 is a schematic view of the flow control valve where the second valve member is in an open state.

During parking, the second valve member 65 and the first valve member 67 of the flow control valve 38 are respectively kept in the closed state due to the coil springs 75 and 86 as shown in FIG. 7. In this condition, the pressing rod 98 of the step motor 90 is in a retracted position (upper position), and the pressing plate 99 of the pressing rod 98 is positioned away from the valve plate 69 of the second valve member 65 and the protruding shaft 87 of the first valve member 67. The protruding shaft 87 of the first valve member 67 has an upper end protruding above the valve plate 69 of the second valve member 65. The second valve member 65 closes the second valve aperture 63 of the second valve seat 62 of the valve housing 51. The first valve member 67 closes the first valve aperture 79 of the first valve seat 78 of the second valve member 65. Thus, when both of the first valve member 67 and the second valve member 65 are closed, communication between the first pathway 45 and the second pathway 57 of the fluid pathway 64 in the valve housing 51 is blocked. In such condition, the fuel vapor vaporized in the fuel tank 15 does not flow from the fuel vapor pipe 31 into the canister 34 in the fuel vapor treating system 12 (FIG. 1).

In order to flow a small amount of the fuel vapor from the fuel tank 15 through the fuel vapor pipe 31 into the canister 34 while the vehicle is moving, the ECU 45 (FIG. 1) transmits the signals for opening the valve to the step motor 90 of the flow control valve 38 such that the rotor 97 is rotated in a direction for opening the valve. Thus, the pressing rod 98 moves downwardly from the retracted position (the upper position) (FIG. 8). The pressing rod 98 (including the pressing plate 99) presses the protruding shaft 87 of the first valve member 67 downwardly, so that the first valve member 67 opens (moves downwardly) against biasing force from the first coil spring 86. That is, when the valve plate 81 of the first valve member 67 moves away from the first valve seat 78 of the second valve member 65, the first valve aperture 79 of the first valve seat 78 is opened. Here, the position of the pressing rod 98 in this state is called as first advance position (first lower position).

Therefore, the first pathway 54 and the second pathway 57 of the fluid pathway 64 in the valve housing 51 are communicated with each other via empty spaces between the second valve member 65 and the first valve member 67, which are composed of a ring space between the inner cylindrical portion 72 of the second valve member 65 and the guide cylindrical portion 84 of the first valve member 67, an empty space between the valve plate 69 of the second valve member 65 and the valve plate 81 of the first valve member 67, a ring space between a wall defining the first valve aperture 79 and the protruding shaft 87, and a ring space between a wall defining the second valve aperture 63 of the second valve seat 62 of the valve housing 51 and the pressing rod 98 (including the pressing plate 99). Accordingly, the fuel vapor vaporized in the fuel tank 15 flows through the fuel vapor pipe 31 into the canister 34 in the fuel vapor treating system 12 (FIG. 1). The amount of the fuel vapor flowing through the fuel vapor pipe 31 depends on an opening area opened by the first valve member 67, in detail, a minimum opening area in the spaces between the second valve member 65 and the first valve member 67 (for example, an opening area of the ring space between the wall defining the first valve aperture 79 and the protruding shaft 87).

Figure 9:
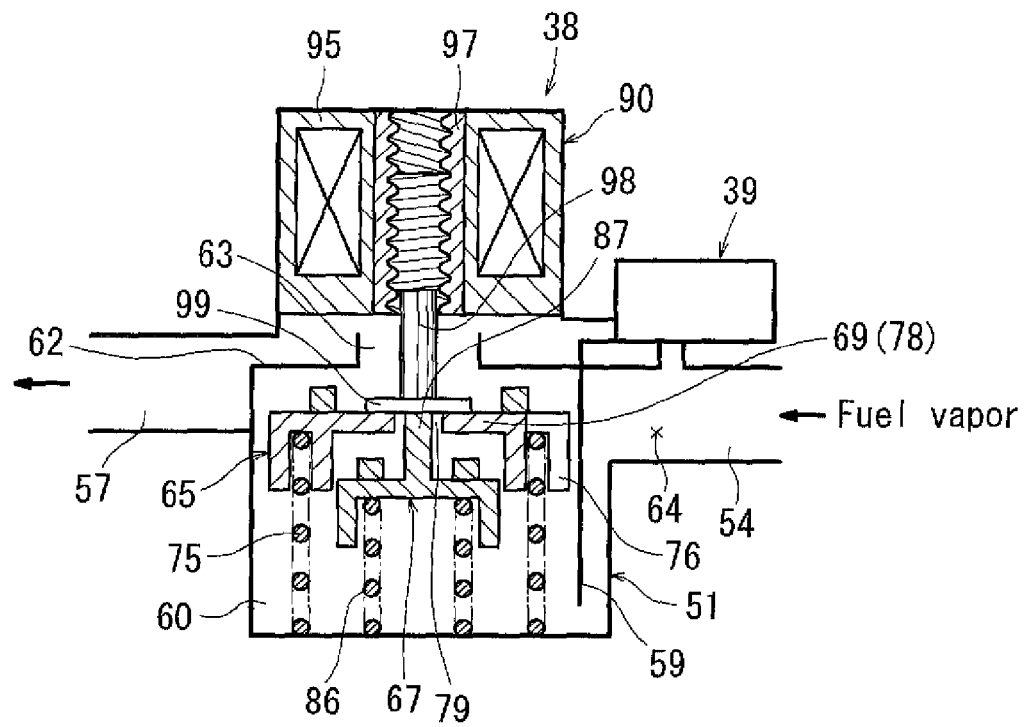
FIG. 9 is a schematic cross sectional view showing the flow control valve including a second valve member in an open state.

In order to flow a large amount of the fuel vapor from the fuel tank 15 through the fuel vapor pipe 31 into the canister 34 during moving, refueling or the like, the ECU 45 (FIG. 1) further transmits the signals for opening the valve to the step motor 90 of the flow control valve 38 such that the rotor 97 is additionally rotated in the direction for opening the valve. Thus, the pressing rod 98 advances (moves downwardly) from the first advance position (the first lower position) (FIG. 9). The pressing rod 98 (including the pressing plate 99) presses the valve plate 69 of the second valve member 65 downwardly in addition to the protruding shaft 87 of the first valve member 67, and thus the second valve member 65 opens (moves downwardly) against a biasing force from the second coil spring 75. That is, when the valve plate 69 of the second valve member 65 moves away from the second valve seat 62 of the valve housing 51, the second valve aperture 63 of the second valve seat 62 is opened. Here, the position of the pressing rod 98 in this state is called as a second advance position (a second lower position).

Therefore, the first pathway 54 and the second pathway 57 of the fluid pathway 64 in the valve housing 51 are communicated with each other via empty spaces between the valve housing 51 and the second valve member 65, which are composed of an empty space between the cylindrical wall 59 of the valve housing 51 and a side wall of the second valve member 65 defining the gaps 76, an empty space between the second valve seat 62 and the valve plate 69 of the second valve member 65, and a ring space between a wall defining the second valve aperture 63 of the second valve seat 62 of the valve housing 51 and the pressing rod 98 (including the pressing plate 99). Thus, the fuel vapor vaporized in the fuel tank 15 flows through the fuel vapor pipe 31 into the canister 34 in the fuel vapor treating system 12 (FIG. 1). The amount of the fuel vapor flowing through the fuel vapor pipe 31 depends on an opening area opened by the second valve member 65, in detail, a minimum opening area in the spaces between the cylindrical wall 59 of the valve housing 51 and the second valve member 65 of the second valve seat 62 (for example, an opening area of the ring space between the wall defining the second valve aperture 63 and the pressing rod 98 (including the pressing plate 99)).

The opening area of the first valve member 67, i.e., an opening area opened and closed by the first valve member 67, is larger than that of the second valve member 65.

In the valve opening state (FIGS. 8 and 9), the step motor 90 of the flow control valve 38 receives the signals for closing the valve, and then rotates the rotor 97 in a direction for closing the valve in order to retract (move upwardly) the pressing rod 98. As a result, the flow control valve 38 is returned to the valve closing state (FIG. 7).

The flow control valve 38 has the pressing rod 98, which is reciprocated by the step motor 90, and the first valve member 67 and the second valve member 65 for opening and closing the fluid pathway 64 which the fuel vapor (fluid) flows through. The first valve member 67 and the second valve member 65 are biased in the direction for closing the fluid pathway 64 due to the coil springs 86 and 75, respectively. The first valve member 67 and the second valve member 65 are sequentially opened due to the pressing rod 98 advanced by the step motor 90. Therefore, it is able to precisely open the first valve member 67 and the second valve member 65 in turns due to advancing movement of the pressing rod 98. Therefore, it is able to improve control of the flow rate compared with the known solenoid valve.

In addition, because the single step motor 90 can move the two valve members 65 and 67, it is able to reduce size, weight and manufacturing cost for the flow control valve 38.

The step motor 90 can be used as the electromagnetic driving member. Thus, it is able to simplify configurations of the flow control valve 38 and the ECU 45 and to reduce the manufacturing cost, the weights and the sizes for the flow control valve 38 and the ECU 45 compared with the known solenoid valve, which controls the flow rate due to duty-cycle control (on-off control) of the electromagnetic driving member. In addition, in a case of the known solenoid valve (refer to JP2005-291241A), when fixing the valve housing 51 on a vehicle body, it is necessary to provide an anti-vibration member such as air damper, rubber bush or the like for reducing noise generated due to the duty-cycle control. On the other hand, in the case of the flow control valve 38 of this disclosure, because the anti-vibration member can be omitted or simplified, it is able to decrease the number of parts, the manufacturing cost and installation space for the flow control valve 38.

The opening area opened and closed by the first valve member 67 in the fluid pathway 64 is smaller than the opening area opened and closed by the second valve member 65 in the fluid pathway 64. Thus, the first valve member 67 is opened for flowing the small amount of the fuel vapor, whereas the second valve member 65 is opened for flowing the large amount of the fuel vapor.

The first valve aperture 79 communicating the upstream side and the downstream side of the fluid pathway 64 is formed in the second valve member 65 and is closed and opened by the first valve member 67. Accordingly, it is able to mount the first valve member 67 on the second valve member 65 compactly compared with a configuration where individual fluid pathways are independently opened and closed by valve members. Therefore, it is able to reduce the size and the weight of the flow control valve 38.

The first guide member (the inner cylindrical portion 72 of the second valve member 65 and the guide cylindrical portion 84 of the first valve member 67) guiding the first valve member 67 in the opening and closing directions is provided between the first valve member 67 and the second valve member 65. Thus, it is able to stabilize movement of the first valve member 67 relative to the second valve member 65 in the opening and closing directions (axial direction).

The second guide member (the cylindrical wall 59 of the valve housing 51 and the outer cylindrical portion 73 of the second valve member 65) guiding the second valve member 65 in the opening and closing directions is provided between the second valve member 65 and the lower portion of the valve housing 51. Thus, it is able to stabilize movement of the second valve member 65 relative to the valve housing 51 in the opening and closing directions (axial direction).

In addition, at least one of the first guide member and the second guide member can be omitted.

The first coil spring 86 and the second coil spring 75 concentrically placed in a double ring manner correspond to the first biasing member biasing the first valve member 67 in the closing direction and the second biasing member biasing the second valve member 65 in the closing direction, respectively. The first guide member (the inner cylindrical portion 72 of the second valve member 65 and the guide cylindrical portion 84 of the first valve member 67) is disposed between the first coil spring 86 and the second coil spring 75 in the radial direction. Accordingly, it is able to place the first coil spring 86, the second coil spring 75 and the first guide member compactly. Thus, it is able to reduce the size and the weight of the flow control valve 38.

The fuel vapor treating system 12 has the flow control valve 38 such that the fluid pathway 64 of the flow control valve 38 is interposed into the fuel vapor pipe 31 communicating the fuel tank 15 and the canister 34. Thus, because the flow control valve 38 concisely regulates the flow rate of the fuel vapor flowing through the fuel vapor pipe 31 while purging the fuel vapor, it is able to prevent disturbance in air-fuel ratio (A/F).

Figure 10:
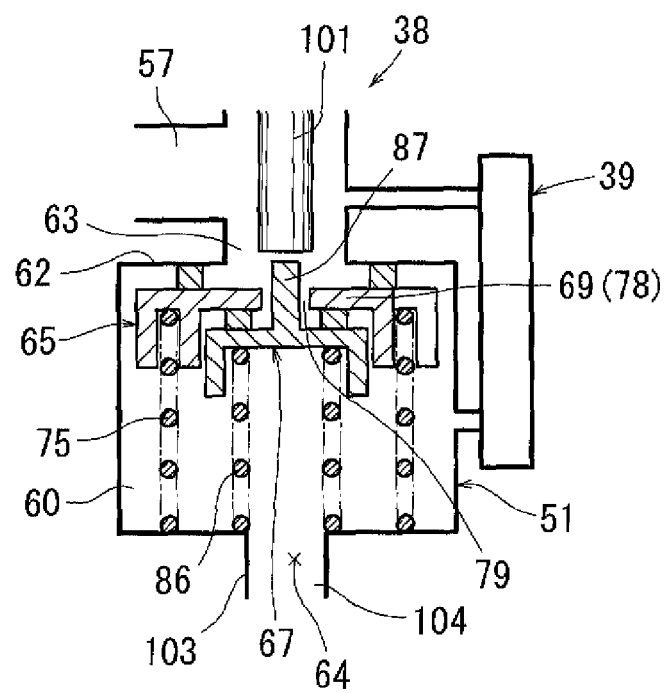
FIG. 10 is a schematic cross sectional view showing a main part of a flow control valve in a second embodiment.

A second embodiment of this disclosure will be described. This embodiment substantially corresponds to the first embodiment further including some modifications. Thus, such modifications will be described, and the same configurations will not be described. FIG. 10 is a schematic view showing a main part of the flow control valve of the second embodiment.

The flow control valve 38 of this embodiment has a straight pressing rod 101 (FIG. 10) instead of the pressing rod 98 having the pressing plate 99 in the first embodiment (FIG. 7). Because the shape of the pressing rod 101 is simplified, it is able to reduce manufacturing cost for the pressing rod 101. The pressing rod 101 has an outer diameter, which is larger than the diameter of the first valve aperture 79 of the second valve member 65 and is smaller than the diameter of the second valve aperture 63.

The flow control valve 38 of this embodiment has a first connecting pipe 103 extending downwardly from a lower surface of the valve housing 51 instead of the first connecting pipe 53 of the first embodiment. The first connecting pipe 103 defines a first pathway 104 therein.

Figure 11:
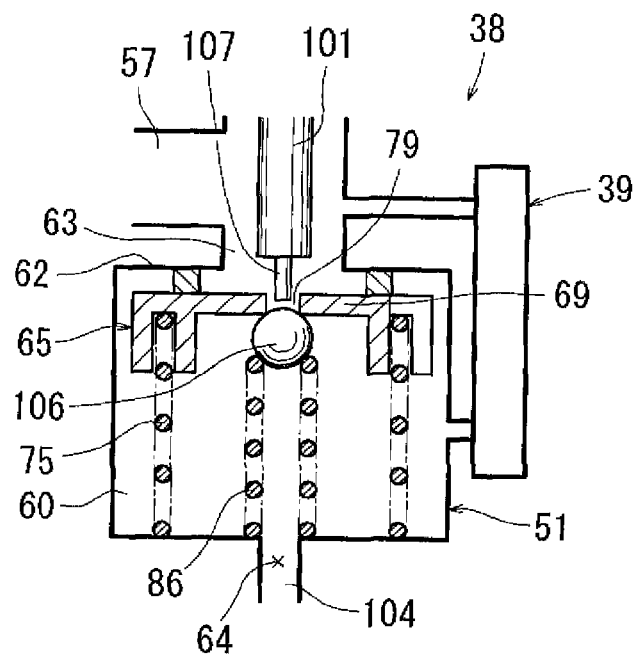
FIG. 11 is a schematic cross sectional view showing a main part of a flow control valve in a third embodiment.

A third embodiment of this disclosure will be described. This embodiment substantially corresponds to the second embodiment further including some modifications. Thus, such modifications will be described, and the same configurations will not be described. FIG. 11 is a schematic view showing a main part of the flow control valve of the third embodiment.

The flow control valve 38 of this embodiment has a first valve member 106 in a ball shape (FIG. 11) instead of the first valve member 67 in the second embodiment (FIG. 10). The First valve member 106 opens and closes the first valve aperture 79 of the second valve member 65. Thus, the inner cylindrical portion 72 of the second valve member 65 is omitted.

The pressing rod 101 concentrically has a protruding shaft 107 having smaller diameter and extending from a lower surface of the pressing rod 101. The protruding shaft 107 has an outer diameter smaller than the diameter of the first valve aperture 79 of the second valve member 65. When the pressing rod 101 moves downwardly, the protruding shaft 107 presses and moves downwardly (opens) the first valve member 106.

A fourth embodiment of this disclosure will be described. This embodiment substantially corresponds to the second embodiment further including some modifications. Therefore, such modifications will be described, and the same configurations will not be described. FIG. 12 is a schematic view showing a main part of the flow control valve of the fourth embodiment.

The flow control valve 38 of this embodiment has a first valve member 109 not having the protruding shaft 87 (FIG. 12) instead of the first valve member 67 of the second embodiment (FIG. 10). In addition, the flow control valve 38 has a pressing rod 111 having an outer diameter smaller than that of the pressing rod 101 instead of the pressing rod 101 in the second embodiment (FIG. 10). The outer diameter of the pressing rod 111 is smaller than the diameter of the first valve aperture 79 of the second valve member 65. Thus, when moving downwardly, the pressing rod 111 presses and moves downwardly (opens) the first valve member 109. The pressing rod 111 has a pressing flange 112, which is formed in a circular plate shape, at a predetermined distance from the lower end of the pressing rod 111. The pressing flange 112 has an outer diameter, which is smaller than the diameter of the second valve aperture 63 and is larger than the diameter of the first valve aperture 79 of the second valve member 65. Thus, when the pressing rod 111 moves downwardly, the pressing flange 112 presses and moves downwardly (opens) the valve plate 69 of the second valve member 65.

In other embodiments, it can be configured that individual fluid pathways 64 are independently closed and opened by valve members (the first valve member and the second valve member). In addition, the solenoid of this disclosure can be applied to devices other than the flow control valve 38 of the fuel vapor treating system 12.

This invention claims:

1. A solenoid valve comprising:
 a valve housing defining a fluid pathway for flowing fluid therein;
 a first valve member configured to open and close the fluid pathway;
 a first biasing member biasing the first valve member in a direction for closing the fluid pathway;
 a second valve member configured to open and close the fluid pathway;
 a second biasing member biasing the second valve member in a direction for closing the fluid pathway;
 a pressing rod; and
 an electromagnetic driving member pressing the pressing rod against the first valve member and the second valve member sequentially in order to open the fluid pathway in stages;
 wherein the second valve member defines a communicating pathway therein communicating an upstream side and a downstream side in the fluid pathway, and the first valve member is capable of closing and opening the communicating pathway;
 a first guide member, which is provided between the first valve member and the second valve member and guides the first valve member in a direction for opening and closing the fluid pathway, and
 a second guide member, which is provided between the second valve member and a portion of the valve housing defining the fluid pathway and guides the second valve member in a direction for opening and closing the fluid pathway;
 wherein the first biasing member includes a first coil spring, the second biasing member includes a second coil spring, the first coil spring is positioned at least partially within the second coil spring, and the first guide member is placed between an outer diameter of the first coil spring and an inner diameter of the second coil spring;
 wherein the second valve member comprises:
 a valve plate, and
 an inner cylindrical portion and an outer cylindrical portion each extending downward from an outer peripheral portion of the valve plate;

wherein the inner cylindrical portion and the outer cylindrical portion are coaxial with each other and define an annular space therebetween;
wherein the first guide member includes the inner cylindrical portion;
wherein the second guide member includes the outer cylindrical portion; and
wherein one end of the second coil spring is fitted into the annular space.

2. The solenoid valve according to claim 1, wherein the second valve member opens the fluid pathway widely compared with the first valve member.

3. The solenoid valve according to claim 1, wherein: the first valve member includes a valve plate located downwardly of the valve plate of the second valve member, and a guide cylindrical portion extending downward from an outer peripheral portion of the valve plate of the first valve member and located radially inward of the inner cylindrical portion of the second valve member, and wherein the first guide member further includes the guide cylindrical portion, so that the guide cylindrical portion can move in an axial direction along an inside of the inner cylindrical portion of the second valve member.

4. The solenoid valve according to claim 3, wherein the first valve member further includes a protruding shaft extending upwardly from the valve plate of the first valve member.

5. The solenoid valve according to claim 3, wherein the first coil spring is interposed between the valve plate of the first valve member and a first portion of the valve housing opposed to the valve plate of the first valve member, and the second coil spring is interposed between the valve plate of the second valve member and a second portion of the valve housing opposed to the valve plate of the second valve member.

6. The solenoid valve according to claim 1, wherein the second coil spring is placed concentrically with the first coil spring.

7. A solenoid valve comprising:
a valve housing defining a fluid pathway for flowing fluid therein;
a first valve member configured to open and close the fluid pathway;
a first biasing member biasing the first valve member in a direction for closing the fluid pathway;
a second valve member configured to open and close the fluid pathway;
a second biasing member biasing the second valve member in a direction for closing the fluid pathway;
a pressing rod; and
an electromagnetic driving member pressing the pressing rod against the first valve member and the second valve member sequentially in order to open the fluid pathway in stages;
wherein the second valve member defines a communicating pathway therein communicating an upstream side and a downstream side in the fluid pathway, and the first valve member is capable of closing and opening the communicating pathway;
a first guide member, which is provided between the first valve member and the second valve member and guides the first valve member in a direction for opening and closing the fluid pathway, and
a second guide member, which is provided between the second valve member and a portion of the valve housing defining the fluid pathway and guides the second valve member in a direction for opening and closing the fluid pathway;
wherein the first biasing member includes a first coil spring, the second biasing member includes a second coil spring placed concentrically around the first coil spring, and the first guide member is placed between the first coil spring and the second coil spring;
wherein the first coil spring is interposed between a valve plate of the first valve member and a first portion of the valve housing opposed to the valve plate of the first valve member,
wherein the second coil spring is interposed between a valve plate of the second valve member and a second portion of the valve housing opposed to the valve plate of the second valve member;
wherein the second valve member includes a cylindrical portion extending downward from an outer peripheral portion of the valve plate of the second valve member;
wherein the first guide member includes the cylindrical portion of the second valve member, and
wherein the cylindrical portion is positioned between an outer diameter of the first coil spring and an inner diameter of the second coil spring.

* * * * *